(12) United States Patent
Weberg et al.

(10) Patent No.: US 11,405,070 B2
(45) Date of Patent: Aug. 2, 2022

(54) RADIO TRANSCEIVERS

(71) Applicant: Nordic Semiconductor ASA, Trondheim (NO)

(72) Inventors: Stein Erik Weberg, Trondheim (NO); Werner Luzi, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 120 days.

(21) Appl. No.: 16/763,698

(22) PCT Filed: Nov. 7, 2018

(86) PCT No.: PCT/GB2018/053231
§ 371 (c)(1),
(2) Date: May 13, 2020

(87) PCT Pub. No.: WO2019/097207
PCT Pub. Date: May 23, 2019

(65) Prior Publication Data
US 2020/0343931 A1   Oct. 29, 2020

(30) Foreign Application Priority Data

Nov. 16, 2017 (GB) ........................................ 1718976

(51) Int. Cl.
*H04B 1/44* (2006.01)
(52) U.S. Cl.
CPC ..................................... *H04B 1/44* (2013.01)
(58) Field of Classification Search
CPC . C12N 15/01; C12N 1/36; C12N 1/38; H04B 1/40; H04B 1/44; C12Q 1/025
See application file for complete search history.

(56) References Cited

U.S. PATENT DOCUMENTS

2008/0207256 A1   8/2008   Chan
2009/0017775 A1*  1/2009   Qiao ........................ H04B 1/44
                                                                    455/78

(Continued)

FOREIGN PATENT DOCUMENTS

CN       101159441 A    4/2008
CN       102884724 A    1/2013
EP       2 847 869 A1   3/2015

OTHER PUBLICATIONS

International Search Report and Written of the International Searching Authority for PCT/GB2018/053231, dated Feb. 5, 2019, 13 pages.

(Continued)

*Primary Examiner* — Thanh C Le
(74) *Attorney, Agent, or Firm* — Klarquist Sparkman, LLP

(57) ABSTRACT

A radio transceiver device comprises a transmit amplifier, a receive amplifier, an impedance matching circuit portion, and an antenna connection node for connection to an antenna. The impedance matching circuit portion is arranged between the antenna connection node and each of the transmit and receive amplifiers. The impedance matching circuit portion comprises a switch and an inductor and is arranged such that, in a receive mode of operation, the switch is first state and incoming signals from the antenna pass to the receive amplifier via the inductor. In a transmit mode of operation, the switch is in a second state and the transmit amplifier is coupled to a power supply rail $V_{DD}$ via the inductor.

11 Claims, 4 Drawing Sheets

(56) References Cited

U.S. PATENT DOCUMENTS

2010/0203844 A1    8/2010  Gorbachov
2011/0003563 A1*  1/2011  Gorbachov ........ H01Q 21/0025
                                                            455/78

OTHER PUBLICATIONS

IPO Search Report under Section 17(5) for GB1718976.2, dated May 8, 2018, 4 pages.
Office Action issued in EP 18804066.1, dated Oct. 1, 2021, 5 pages.
Office Action issued in CN 201880086396.2, dated Jul. 1, 2021, 6 pages.

* cited by examiner

RADIO TRANSCEIVERS

CROSS REFERENCE TO RELATED APPLICATIONS

This is the U.S. National Stage of International Application No. PCT/GB2018/053231, filed Nov. 7, 2018, which was published in English under PCT Article 21(2), which in turn claims the benefit of Great Britain Application No. 1718976.2, filed Nov. 16, 2017.

The present invention relates to radio transceivers, particularly half-duplex radio transceivers that utilise different amplifier circuits for transmission and reception of radio signals via an antenna.

Many modern electronic devices comprise radio transceivers that allow the device to communicate with other electronic devices wirelessly. Such a transceiver is arranged both to transmit and to receive radio signals via one or more antennas. Such transmitted and received signals typically require amplification for proper transmission and reception respectively. However, the types of amplifiers required for transmission and reception are different. For example, a radio transceiver may employ a power amplifier (PA) for transmission and a low noise amplifier (LNA) for reception. These different amplifiers typically have different impedance matching requirements for connection to an antenna.

Conventional transceivers may provide different antennas for transmission and reception, such that impedance matching can be carried out separately for each amplifier. Alternatively, the amplifiers may be connected to a common antenna via separate impedance matching circuits such that each amplifier has a separate signal path to the antenna, where each of the separate impedance matching circuits can be enabled or disabled as appropriate when transmitting or receiving.

The Applicant has appreciated that there are drawbacks with both of these arrangements.

When viewed from a first aspect, the present invention provides a radio transceiver device comprising:
a transmit amplifier;
a receive amplifier;
an antenna connection node; and
an impedance matching circuit portion arranged between the antenna connection node and each of the transmit and receive amplifiers, said impedance matching circuit portion comprising a switch and an inductor and being arranged such that:
in a receive mode of operation, the switch is first state and incoming signals from the antenna connection node pass to the receive amplifier via the inductor; and
in a transmit mode of operation, the switch is in a second state and the transmit amplifier is coupled to a power supply rail via the inductor.

Thus it will be appreciated by those skilled in the art that embodiments of the present invention provide an improved radio transceiver that uses the same impedance matching circuit for both the transmit and receive amplifiers, where the impedance varies between two different values for transmission and reception. In the receive mode, the inductor provides an additional source of impedance, increasing the impedance seen by the receive amplifier. Conversely, in the transmit mode, signals produced by the transmitter do not pass through the inductor and the inductor prevents transmitted signals from reaching the input of the receive amplifier. Furthermore, the inductor provides a source of current (typically DC) for the transmit amplifier. This advantageous arrangement requires fewer external (i.e. off-chip) electronic components, thus lowering the bill of materials and the associated cost of such a radio transceiver compared to conventional radio transceivers.

While it will be appreciated that there are a number of different amplifier circuits known in the art per se that could be used as a receive amplifier, in a set of preferred embodiments the receive amplifier comprises a low noise amplifier (LNA). Low noise amplifiers are particularly advantageous for reception of radio signals as they can amplify very low-power signals picked up by an antenna while substantially maintaining the signal-to-noise ratio of the signals.

Similarly, there are many amplifier circuits known in the art per se suitable for implementing the transmit amplifier, however in some embodiments the transmit amplifier comprises a power amplifier. Power amplifiers are well suited for converting a low-power signal (for example, a signal produced by a microcontroller or a sensor) to a higher power signal suitable for driving an antenna so as to transmit the signal.

Typically the switch's first state may be a disabled state and the second state may be an enabled state. By enabling or disabling the switch, the impedance matching circuit portion is able to operate the impedance matching circuit portion in the receive mode or the transmit mode respectively. In some embodiments, the switch comprises a field-effect-transistor (FET). A mode select signal may be applied to a gate terminal of said field-effect-transistor. In a preferred set of such embodiments the switch comprises a p-channel metal-oxide-semiconductor field-effect-transistor (pMOSFET), wherein a source terminal of the pMOSFET is connected to the supply voltage and a drain terminal of the pMOSFET is connected to the first terminal of the first inductor. The Applicant has appreciated that by using a transistor as a switch in this manner, an additional advantage may be achieved in that the transistor may, due to its inherent capacitance, act as a capacitor connected to the input of the receive amplifier. Certain types of amplifiers such as LNAs require a capacitor to be connected to their input and thus this switch removes the need for an additional component to be provided, further reducing the bill-of-materials for the transceiver.

In some embodiments, the impedance matching circuit portion comprises a second inductor having a first terminal thereof connected to a second terminal of the first inductor and to an output of the transmit amplifier, wherein a second terminal of said second inductor is connected to the antenna connection node.

The impedance matching circuit may comprise resistors, capacitors, and/or inductors arranged in any suitable topology to provide a given transfer function. However in some embodiments, the impedance matching circuit portion comprises an upstream capacitor having a first terminal thereof connected to the first terminal of the second inductor and a second terminal thereof connected to ground. Additionally or alternatively, in some embodiments the impedance matching circuit portion comprises an intermediate capacitor having a first terminal thereof connected to the second terminal of the second inductor and a second terminal thereof connected to ground.

While the capacitors referred to above could have fixed capacitance values, in a set of embodiments the upstream and/or intermediate capacitors are programmable. Programmable capacitors (e.g. variable capacitors or arrays of field-effect-transistors that can be selectively enabled or disabled with an appropriate control signal) advantageously provide a mechanism for varying the impedance provided by the impedance matching circuit portion with relative ease.

In some embodiments, the second terminal of the second inductor is connected to the antenna connection node via a DC blocking capacitor. Such a DC blocking capacitor prevents DC signals (e.g. non-zero DC offsets) being provided to the antenna in the transmit mode and also prevents such DC signals interfering with signals received in the receive mode.

In use an antenna would typically be connected to the antenna connection node. For example the antenna may be a dual-feed antenna such as a loop antenna or a dipole antenna, however it is preferably a single-feed antenna such as a monopole antenna or a chip antenna. However, it will be appreciated that any other suitable type of antenna known in the art may be used.

When viewed from a second aspect, the present invention provides a radio transceiver device comprising:

an impedance matching circuit portion having first, second and third connection nodes, wherein the first connection node is connected to an antenna, the second connection node is connected to a receive amplifier, and the third connection node is connected to a transmit amplifier, wherein said impedance matching circuit portion is arranged such that:

in a receive mode of operation, the second connection node has a first impedance value and the third connection node has a second impedance value;

in a transmit mode of operation, the second connection node has a third impedance value different to the first impedance value, the third connection node has a fourth impedance value different to the second impedance value, and the fourth impedance value is less than the first impedance value.

It will be appreciated that any technical features described hereinabove in relation to the first aspect apply equally to the second aspect where appropriate.

An embodiment of the present invention will now be described with reference to the accompanying drawings, in which.

Figure 1:
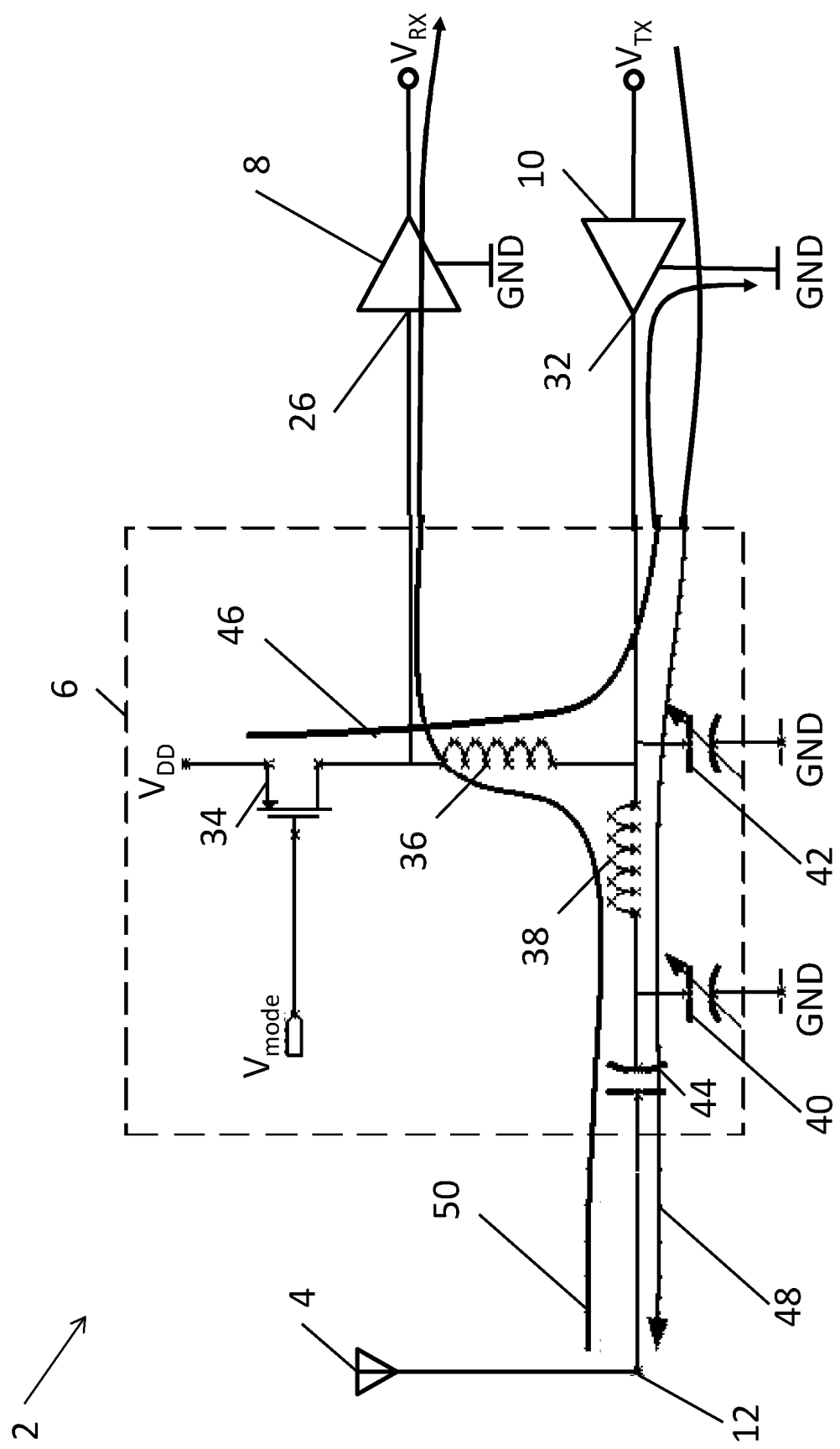
FIG. 1 is a circuit diagram of a radio transceiver in accordance with an embodiment of the present invention.

FIG. 1 is a circuit diagram of a radio transceiver 2 in accordance with an embodiment of the present invention. The radio transceiver 2 comprises: an antenna 4; an impedance matching circuit portion 6; a low noise amplifier (LNA) 8; and a power amplifier (PA) 10. While it will be appreciated that the impedance matching circuit portion 6, the LNA 8, and the PA 10 would typically be implemented as a single integrated circuit, here they are divided into separate, logical portions for ease of reference.

The antenna 4 may be of any suitable type such as, for example, a monopole antenna or a chip antenna. This antenna 4 is connected to an antenna connection node 12 which is connected to the LNA 8 and the PA 10 via the impedance matching circuit portion 6. The LNA 8 is a receive amplifier and this is used to amplify signals received by the antenna 4 while the transceiver 2 is in a receive mode. The PA 10 is a transmit amplifier and this is used to amplify signals that are used to drive the antenna 4 in a transmit mode of the transceiver 2. Thus the radio transceiver 2 is suitable for half-duplex communications, i.e. where the transceiver 2 can be used both for the transmission and the reception of radio signals but not both at the same time.

The impedance matching circuit portion 6 comprises: a mode selection pMOSFET 34; first and second inductors 36, 38; first, upstream and second, intermediate programmable capacitors 40, 42; and a fixed DC block capacitor 44. The impedance matching circuit portion 6 is situated between the antenna 4 and each of the LNA 8 and PA 10.

The mode selection pMOSFET 34 is arranged such that its source terminal is connected to VDD and its drain terminal is connected to a first terminal of the first inductor 36 and the input node 26 of the LNA 8. The gate terminal of the mode selection pMOSFET 34 is connected to a mode selection voltage $V_{mode}$ as will be described in further detail below.

The second terminal of the first inductor 36 is connected to the output node 32 of the PA 10, and first terminals of both the second inductor 38 and the second programmable capacitor 42. The second terminal of the second inductor 38 is connected to first terminals of both the first programmable capacitor 40 and the fixed DC block capacitor 44. The second terminals of the first and second programmable capacitors 40, 42 are both connected to ground GND. The second terminal of the fixed DC block capacitor 44 is connected to the antenna 4.

In use, the transceiver 2 can be switched between the transmission and receive modes by varying the voltage $V_{mode}$ applied to the gate terminal of the mode selection pMOSFET 34. The value of this mode selection voltage $V_{mode}$ sets the transceiver 2 into either a transmit mode (if $V_{mode}$ is logic low) or receive mode (if $V_{mode}$ is logic high).

Figure 2:
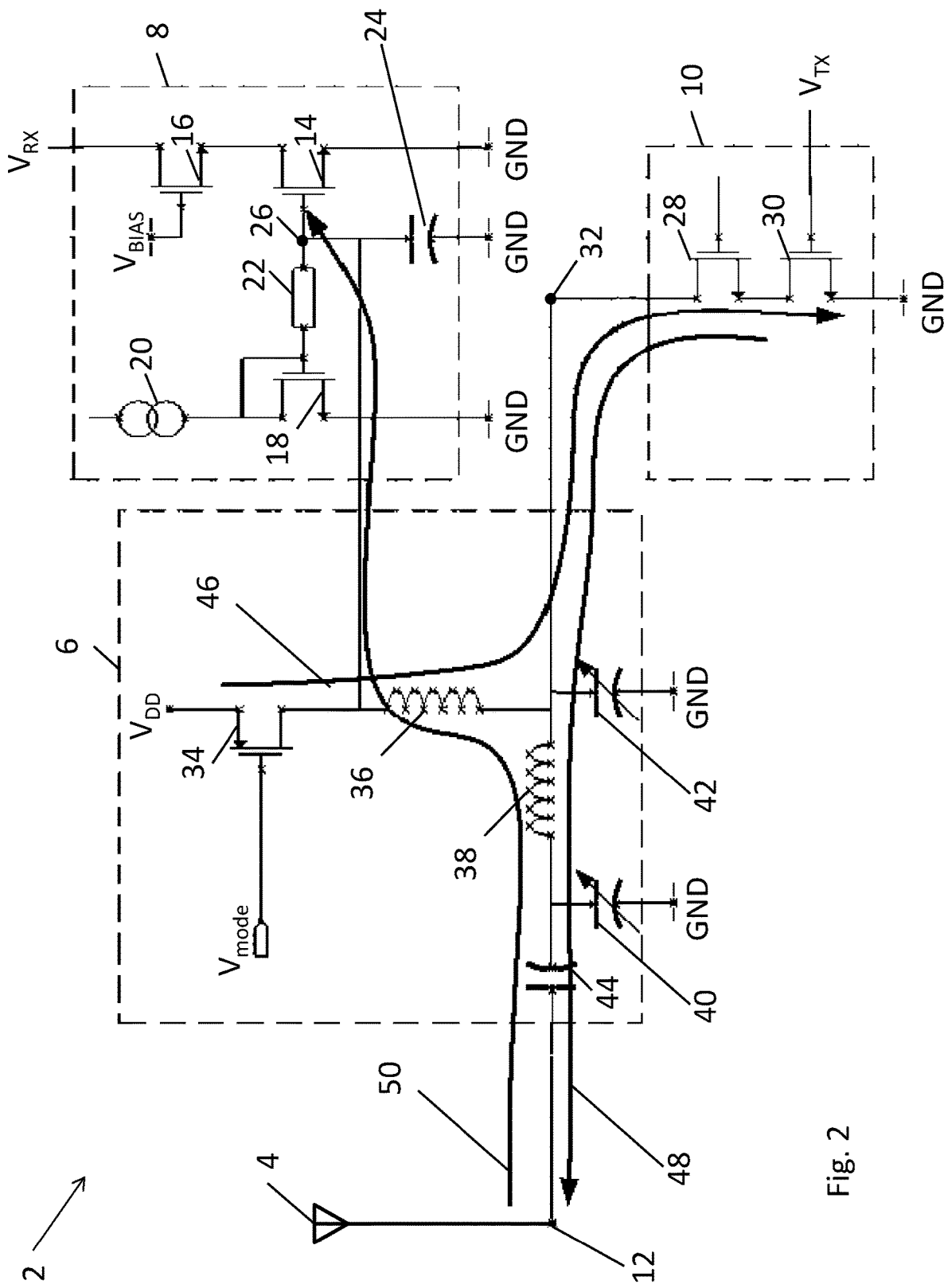
FIG. 2 is a circuit diagram of the transmitter and receiver amplifiers in the radio transceiver of FIG. 1.

FIG. 2 is a circuit diagram of the LNA 8 and the PA 10 in the radio transceiver 2 of FIG. 1. While it will of course be appreciated that there are many different architectures and topologies suitable for implementing the LNA 8 and the PA 10, FIG. 2 illustrates an example of each of these wherein the connections between the components of the LNA 8 and the PA 10 and the components of the impedance matching circuit portion 6 are shown at the transistor level.

The LNA 8 comprises an amplification n-channel metal-oxide-semiconductor field-effect-transistor (nMOSFET) 14; a cascode nMOSFET 16; a current mirror nMOSFET 18; a current source 20; and a fixed resistor 22. The LNA 8 is arranged such that amplification nMOSFET 14 has its drain terminal connected to the source terminal of the cascode nMOSFET 16 and its source terminal connected to ground GND. The drain terminal of the cascode nMOSFET 16 provides the output voltage $V_{RX}$ corresponding to received signals, and the gate terminal of the cascode nMOSFET 16 is connected to a bias voltage $V_{BIAS}$. The gate terminal of the amplification nMOSFET 14 is connected to the gate and drain terminals of the current mirror nMOSFET 18 via the fixed resistor 22. The gate and drain terminals of the current mirror nMOSFET 18 are further connected to the current source 20 and the source terminal of the current mirror nMOSFET 18 is connected to ground GND. The gate terminal of the amplification nMOSFET 14 is further connected to ground GND via a capacitor 24. This capacitor 24 may be an independent component or may be provided by the intrinsic capacitance of the amplification nMOSFET 14. A node 26 connected between the gate terminal of the amplification nMOSFET 14, the fixed resistor 22, and the capacitor 24 forms the input to the LNA 8.

The PA 10 comprises a second cascode nMOSFET 28 and a power amplifier nMOSFET 30. The second cascode nMOSFET 28 and the power amplifier nMOSFET 30 are arranged in series such that the source terminal of the second cascode nMOSFET 28 is connected to the drain terminal of the power amplifier nMOSFET 30, while the source terminal of the power amplifier nMOSFET 30 is connected to ground GND. The PA 10 is arranged such that a transmission voltage $V_{TX}$ is applied to the gate terminal of the power amplifier nMOSFET 30. The drain terminal of the second cascode nMOSFET 28 is connected to a node 32 that forms the output of the PA 10.

By setting the transceiver 2 into transmit mode, a DC current flows from $V_{DD}$ to ground GND through the mode selection pMOSFET 34, the first inductor 36, and the second cascode and power amplifier nMOSFETs 28, 30, thus providing a source of DC current to the PA 10. The path of this DC current is indicated by an arrow 46. The transmission voltage $V_{TX}$ applied to the gate terminal of the power amplifier nMOSFET 30 varies the conductance of the power amplifier nMOSFET 30 and thus the magnitude of the DC current that flows, resulting in an amplified version of the transmission voltage $V_{TX}$ at the output node 32. This amplified signal follows the path indicated by an arrow 48 through the second inductor 38 and the fixed DC block capacitor 44 to the antenna 4 from which it is transmitted over the air.

As an additional advantage, placing the transceiver 2 into transmit mode protects the LNA 8 from being exposed to potentially large voltages. Since the input node 26 of the LNA 8 is connected to the drain terminal of the mode selection pMOSFET 34, it is connected to $V_{DD}$ in the transmit mode which effectively grounds the input of the LNA 8. It will be appreciated that $V_{DD}$ effectively acts as ground for AC signals (i.e. those produced by the PA 10 in transmit mode) due to a capacitor (not shown) provided between the power supply rail and ground GND that allows the AC signals to pass to ground GND.

However, when the transceiver 2 is set to receive mode, no DC current flows to the PA 10 and thus it is powered down, reducing the current consumption of the transceiver 2. Incoming signals picked up by the antenna 4 are converted to electrical signals that flow through the fixed DC block capacitor 44, the second inductor 38, and the first inductor 36 to the input node 26 of the LNA 8 as indicated by an arrow 50. The LNA 8 amplifies the (typically weak) signal received from the antenna 4 with minimal degradation to its signal-to-noise ratio (SNR) in a manner well known in the art per se.

The first and second programmable capacitors 40, 42 are arranged such that their respective capacitance values can be varied in use. Typically these are set to a first set of values in the transmission mode and to a second set of values in the reception mode, where these values are selected based on, among other things, the electrical characteristics of the printed circuit board (PCB), the antenna, and the overall package.

Figure 3:
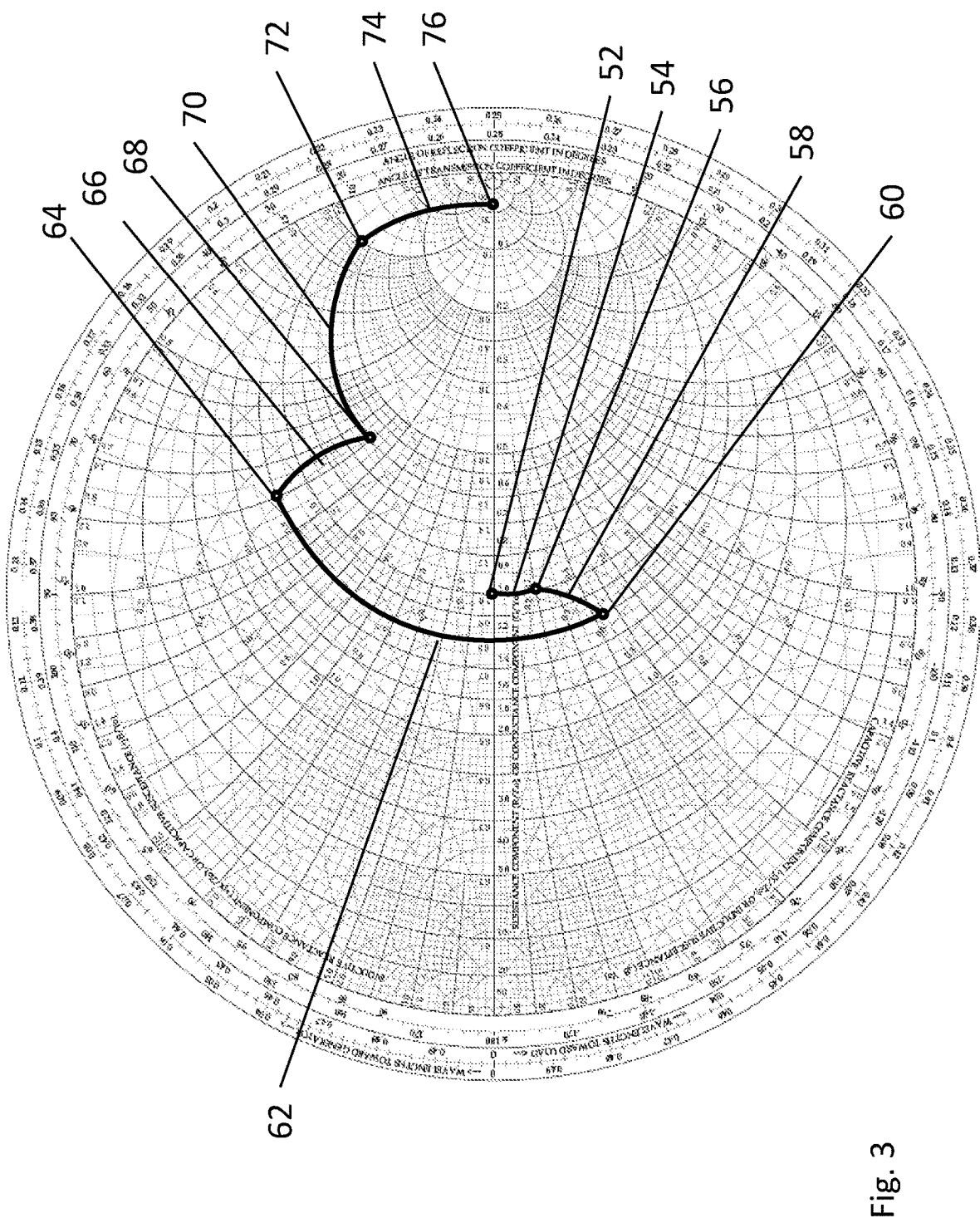
FIG. 3 is a Smith chart illustrating the impedance matching typically provided when the radio transceiver of FIGS. 1 and 2 is in reception mode.

FIG. 3 is a Smith chart illustrating the impedance matching typically provided when the radio transceiver 2 of FIGS. 1 and 2 is in reception mode. As will be appreciated by those skilled in the art, the node 52 at the centre of the Smith chart represents the normalised impedance of the antenna 4 (i.e. the load impedance). Taking each of the components in the impedance matching circuit portion 6 and their respective contributions to its end impedance in turn, working upstream from the antenna 4:

1) The fixed DC block capacitor 44: As this capacitor 44 is a relatively large series capacitor, it 'moves' the impedance a small distance 54 along a constant resistance circle in the capacitive (counter-clockwise) direction to node 56.

2) The first programmable capacitor 40: In the reception mode, this shunt capacitor 40 is typically set to a relatively small value which moves the impedance by a small distance 58 to node 60 along a constant conductance circle.

3) The second inductor 38: This inductor 38 moves the impedance along a constant resistance circle in the inductive (clockwise) direction by a distance 62 to node 64.

4) The second programmable capacitor 42: Similar to the first programmable capacitor 40, this capacitor 42, which combines in parallel with the intrinsic capacitance of the second cascode nMOSFET 28, is typically set to a relatively small value and moves the impedance by a distance 66 to node 68 along a constant conductance circle.

5) The first inductor 36: This inductor 36, in a similar manner to the other inductor 38, moves the impedance by a distance 70 along a resistance circle in the inductive direction to node 72.

6) The capacitor 24 inside the LNA 8: Finally, this capacitor 24 moves the impedance by a distance 74 to node 76 on the real axis—i.e. the resultant impedance is purely real (resistive) with no imaginary (reactive) component.

The resultant end impedance of the impedance matching circuit portion 6 (as seen at the gate terminal of the amplification nMOSFET 14) in the reception mode may typically be around 1 kΩ.

Figure 4:
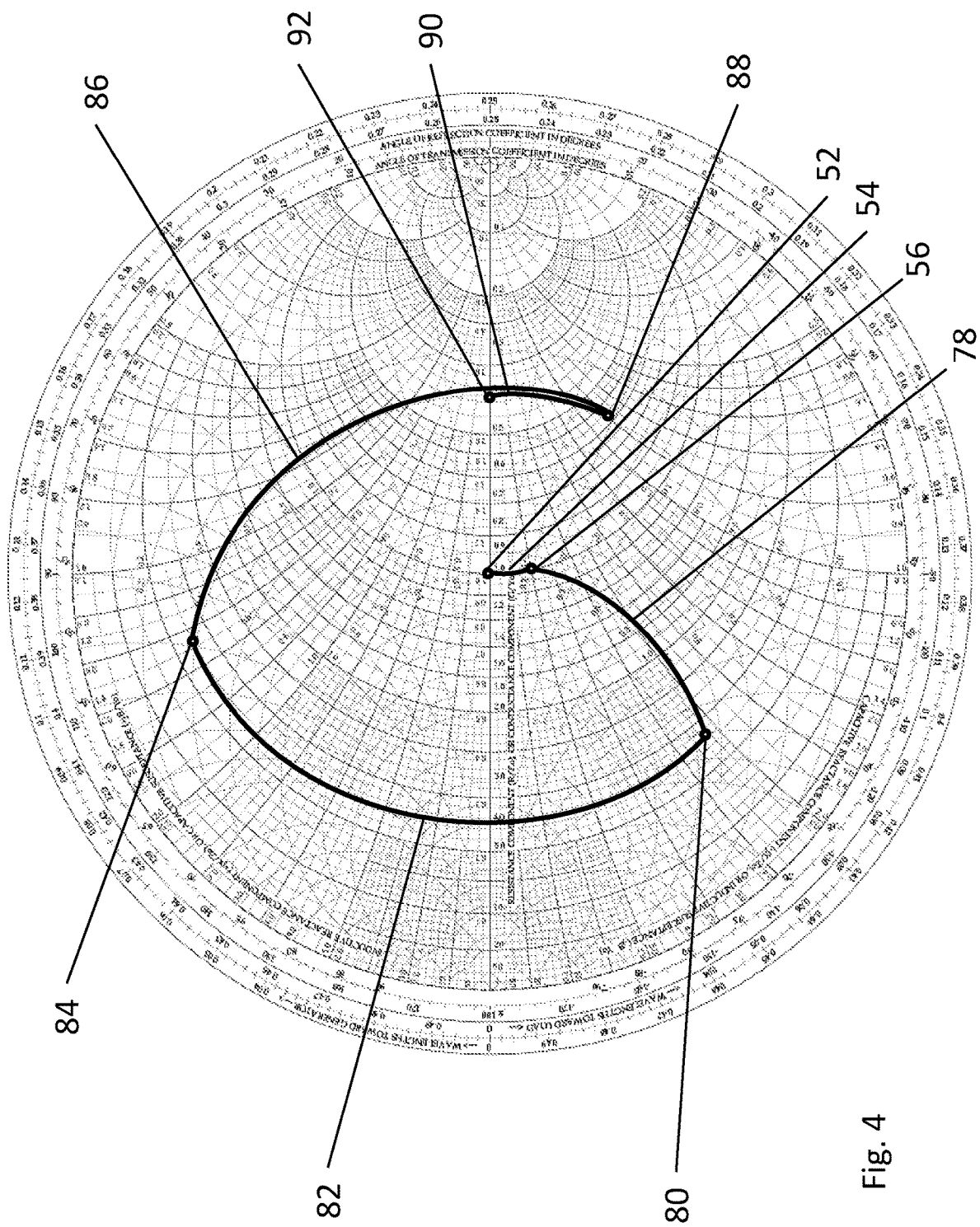
FIG. 4 is a Smith chart illustrating the impedance matching typically provided when the radio transceiver of FIGS. 1 and 2 is in transmission mode.

FIG. 4 is a Smith chart illustrating the impedance matching typically provided when the radio transceiver 2 of FIGS. 1 and 2 is in transmission mode. As before, the node 52 at the centre of the Smith chart represents the normalised impedance of the antenna 4. Taking each of the components in the impedance matching circuit portion 6 and their respective contributions to its end impedance in turn, working downstream from the antenna 4:

1) The fixed DC block capacitor 44: As described above with reference to FIG. 3, this capacitor 44 is a relatively large series capacitor and moves the impedance a small distance 54 along a constant resistance circle in the capacitive (counter-clockwise) direction to node 56.

2) The first programmable capacitor 40: In the transmission mode, this shunt capacitor 40 is typically set to a larger value than in the reception mode. This capacitor 40 moves the impedance by a larger distance 78 to node 80 along a constant conductance circle.

3) The second inductor 38: This inductor 38 moves the impedance along a constant resistance circle in the inductive (clockwise) direction by a distance 82 to node 84.

4) The second programmable capacitor 42: Like the first programmable capacitor 40, this capacitor 42 is typically set to a larger value in the transmission mode than in the reception mode and moves the impedance by a distance 86 to node 88 along a constant conductance circle.

5) The first inductor 36: In the transmission mode, this inductor 36 is a large shunt inductor 70 and cancels some of the contribution to the impedance made by the second programmable capacitor 42. This inductor 36 moves the impedance along a resistance circle in the inductive direction by a distance 90 to node 92. This node 92 is located on the real axis—i.e. the resultant impedance is purely real (resistive) with no imaginary (reactive) component.

Unlike in the reception mode, the capacitor 24 within the LNA 8 provides no contribution to the impedance as it is effectively grounded by the mode selection pMOSFET 34 when the transceiver 2 is operated in the transmission mode.

The resultant end impedance of the impedance matching circuit portion 6 (as seen at the output 32 of the PA 10) in the transmission mode may typically be around 130 Ω.

Thus it will be appreciated by those skilled in the art that embodiments of the present invention described herein provide an improved radio transceiver that uses the same impedance matching circuit for both the transmit and receive amplifiers, where the impedance may be varied between two different values for transmission and reception. It will be appreciated by those skilled in the art that the embodiments described herein are merely exemplary and are not limiting on the scope of the invention.

The invention claimed is:

1. A radio transceiver device comprising:
   a transmit amplifier;
   a receive amplifier;
   an antenna connection node; and
   an impedance matching circuit portion arranged between the antenna connection node and each of the transmit and receive amplifiers, said impedance matching circuit portion comprising a switch and a first inductor and being arranged such that:
   in a receive mode of operation, the switch is first state and incoming signals from the antenna connection node pass to the receive amplifier via the first inductor; and
   in a transmit mode of operation, the switch is in a second state and the transmit amplifier is coupled to a power supply rail via the first inductor,
   wherein the impedance matching circuit portion comprises a second inductor having a first terminal thereof connected to a second terminal of the first inductor and to an output of the transmit amplifier, wherein a second terminal of said second inductor is connected to the antenna connection node.

2. The radio transceiver device as claimed in claim 1, wherein the receive amplifier comprises a low noise amplifier.

3. The radio transceiver device as claimed in claim 1, wherein the transmit amplifier comprises a power amplifier.

4. The radio transceiver device as claimed in claim 1, wherein the first state is a disabled state and the second state is an enabled state.

5. The radio transceiver device as claimed in claim 1, wherein the switch comprises a field-effect-transistor.

6. The radio transceiver device as claimed in claim 5, wherein the switch comprises a pMOSFET, wherein a source terminal of the pMOSFET is connected to the supply voltage and a drain terminal of the pMOSFET is connected to the first terminal of the first inductor.

7. The radio transceiver device as claimed in claim 1, wherein the impedance matching circuit portion comprises an upstream capacitor having a first terminal thereof connected to the first terminal of the second inductor and a second terminal thereof connected to ground.

8. The radio transceiver device as claimed in claim 7, wherein the upstream capacitor is programmable.

9. The radio transceiver device as claimed in claim 1, wherein the impedance matching circuit portion comprises an intermediate capacitor having a first terminal thereof connected to the second terminal of the second inductor and a second terminal thereof connected to ground.

10. The radio transceiver device as claimed in claim 9, wherein the intermediate capacitor is programmable.

11. The radio transceiver device as claimed in claim 1, wherein the second terminal of the second inductor is connected to the antenna connection node via a DC blocking capacitor.

* * * * *